(12) United States Patent
Kury

(10) Patent No.: US 10,550,980 B2
(45) Date of Patent: Feb. 4, 2020

(54) DETACHABLE PLUG CONNECTION

(71) Applicant: NEOPERL GMBH, Mullheim (DE)

(72) Inventor: Werner Kury, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 821 days.

(21) Appl. No.: 14/371,471

(22) PCT Filed: Jan. 7, 2013

(86) PCT No.: PCT/EP2013/000019
§ 371 (c)(1),
(2) Date: Jul. 10, 2014

(87) PCT Pub. No.: WO2013/104533
PCT Pub. Date: Jul. 18, 2013

(65) Prior Publication Data
US 2015/0021902 A1    Jan. 22, 2015

(30) Foreign Application Priority Data

Jan. 13, 2012  (DE) .................... 20 2012 000 597 U
Nov. 30, 2012  (DE) .................... 20 2012 011 531 U

(51) Int. Cl.
*F16L 37/098*    (2006.01)
(52) U.S. Cl.
CPC ....... *F16L 37/0985* (2013.01); *F16L 2201/10* (2013.01)
(58) Field of Classification Search
CPC .................................................. F16L 37/0985
USPC .................... 285/86, 81, 330, 371, 398, 901
See application file for complete search history.

(56) References Cited

U.S. PATENT DOCUMENTS

| | | | | |
|---|---|---|---|---|
| 2,147,835 A | * | 2/1939 | Fine .................... | F16N 21/04 285/101 |
| 3,454,047 A | * | 7/1969 | Johnston ............... | F16L 37/121 137/614.04 |
| 4,903,995 A | * | 2/1990 | Blenkush .............. | F16L 33/225 285/255 |
| 5,374,088 A | | 12/1994 | Moretti et al. | |

(Continued)

FOREIGN PATENT DOCUMENTS

EP        0605801 B1    9/1996
WO    02079684 A1    10/2002

*Primary Examiner* — Anna M Momper
*Assistant Examiner* — Fannie C Kee
(74) *Attorney, Agent, or Firm* — Volpe and Koenig, P.C.

(57) ABSTRACT

A detachable plug connection includes a tubular insert part having a retaining projection on its outer circumference, a sleeve-shaped receiving part, and a connecting element connected to the receiving part with an inwardly directed, upwardly pivotable retaining edge that engages behind the retaining projection after pushing in the insert piece. A sleeve-shaped locking element surrounds the connecting element in a sliding manner and can be displaced between a release position, in which the axial sliding movement is transformed into an opening movement of the retaining edge oriented transversally thereto, and a locking position, in which it surrounds the connecting element preventing upward bending in the region of the retaining edge and the connecting element projects above the locking element, in an intermediate or coupling position of the locking element such that the retaining edge can be bent upwards when the retaining projection on the insert piece is pushed in.

24 Claims, 10 Drawing Sheets

(56) References Cited

U.S. PATENT DOCUMENTS

| | | | | |
|---|---|---|---|---|
| 5,630,570 | A | * | 5/1997 | Lacroix .............. F16L 37/0985 251/149.9 |
| 6,073,974 | A | * | 6/2000 | Meisinger ........... F16L 37/1215 285/316 |
| 6,412,828 | B1 | * | 7/2002 | Lacroix .................. F16L 37/22 285/1 |
| 2003/0025326 | A1 | * | 2/2003 | Schulte .............. F16L 37/0841 285/316 |
| 2007/0040377 | A1 | | 2/2007 | Moretti et al. |
| 2010/0295292 | A1 | * | 11/2010 | Wang ................... F16L 33/223 285/24 |
| 2011/0284561 | A1 | * | 11/2011 | Rosenquist ........... A61M 39/10 220/694 |

* cited by examiner

B - B

B-B

C-C

DETACHABLE PLUG CONNECTION

FIELD OF INVENTION

The invention relates to a detachable plug connection having a tubular insert part which carries at least one retaining projection on its outside circumference, having a sleeve-shaped receiving part, the interior of which is intended for the insertion of the tubular insert piece and having a connecting element which is connected to the receiving part and on which at least one inwardly directed retaining edge is held so it can be bent up or pivoted up, which retaining edge engages behind the retaining projection once the insert part has been pressed in, wherein there is provided a locking element which engages around the connecting element displaceably in such a manner that the locking element can be displaced between a release position and a locking position, in which locking position the locking element engages around the connecting element in such a manner that a bending up of the connecting element in the region of the retaining edge(s) is prevented.

BACKGROUND

EP 605 801 B1 has already previously made known a detachable plug connection of the type mentioned in the introduction which serves as a hose coupling for the connection of two line portions of a liquid line. The previously known plug connection comprises a sleeve-shaped receiving part, into the sleeve interior of which is insertable a tubular insert part which carries on its outside circumference a retaining projection which is realized as a circumferential annular flange. In the coupling position of the previously known plug coupling, the retaining projection, once the insert part has been pressed into the receiving part, is engaged behind by inwardly directed and elastically sprung retaining edges of a connecting element. The retaining edges of the connecting element, which are produced from hard elastic material, are connected together by means of spring webs, which are combined in a V-shaped manner, and can be elastically sprung as a result of a pressure acting on the combined web end regions of the spring webs in such a manner that the retaining edges are disengaged from the retaining projection. In order to lock the position of the connecting element, plate-shaped press buttons, which in the operating position protrude in each case through a complementarily realized reach-through opening in the circumferential wall of the connecting element, are integrally formed on the combined web end regions. It can be a particular advantage for the connecting element which is connected to the one line portion, the insert part which cooperates with the other line portion and the connecting elements to be able to be realized as plastic material injection molding parts. The production of said plastics material molding parts which are matched to one another, however, is connected to considerable expenditure. Above and beyond this, there is the risk that excessive loads which act on the connecting element and/or the insert part transversely with respect to the longitudinal extension thereof result in a break in at least one of said plastics material parts and in unwanted leakages.

WO 02/079684 A1 has already made known a detachable plug connection, which has a tubular insert part which carries at least one retaining projection on its outside circumference and which comprises a sleeve-shaped receiving part, the interior of which is intended for the insertion of the tubular insert part. The previously known plug connection also has a connecting element which is connected to the receiving part and on which at least one inwardly directly retaining edge is held so as to be able to be bent up or pivoted up, which retaining edge engages behind the retaining projection once the insert part has been pressed in. The previously known plug connection also comprises a locking element which consists of two side walls which encompass the connecting element on both sides as well as a transverse wall which holds them in a U-shaped manner and which (locking element) carries an end plate on the end face. Insert faces, by means of which the locking element is guided on the connecting element so as to be transversely displaceable, are integrally molded on the end edges of the side walls which are remote from the end plate of the locking element. The locking element, which is guided on the connecting element so as to be transversely displaceable, is transversely displaceable between a release position and a locking position. Whereas in the release position a recess, which is provided on the end plate of the locking element, is in alignment in such a manner with the interior of the sleeve-shaped receiving part that the insert part is able to be inserted into the receiving part, in the locking position the locking element engages around the connecting element which is provided on the receiving part in such a manner that a bending up of the connecting element in the region of the retaining edges is prevented.

SUMMARY

Consequently, the object, in particular, is to create a plug connection of the type mentioned in the introduction which can be produced at reduced expenditure, by way of which it is possible to produce a connection which is lockable, sturdy and loadable, but at the same time is also easy to detach.

The solution according to the invention to said object in the case of the plug connection of the type mentioned in the introduction is, in particular, that the locking element is developed in sleeve-shaped manner and engages around the connecting element in an axially displaceable manner, that in the release position the axial pushing movement of the locking element can be converted into an opening movement, oriented transversely thereto, of the retaining edge(s) and that the connecting element, with the locking element in an intermediate or coupling position, protrudes at least in regions in such a manner over the locking element that the retaining edge(s) can be bent up when the retaining projection which is provided on the insert part is pressed in.

The plug connection according to the invention comprises a tubular insert part which carries at least one retaining projection on the outside circumference. The insert part is insertable into the sleeve interior of a sleeve-shaped receiving part. The receiving part is connected to a connecting element which, once the insert part has been pressed into the sleeve interior, has to lock the releasable connection between the receiving part and the insert part. Once the insert part has been pressed in, the retaining projection which is provided on the insert part is engaged behind by at least one inwardly directed retaining edge which is held on the connecting element so as to be able to bend up or pivot up. The plug connection according to the invention comprises a sleeve-shaped locking element which engages displaceably around the connecting element in such a manner that the locking element is displaceable between a release position and a locking position. Whereas in the release position the axial pushing movement of the locking element can be converted into an opening movement, oriented transversely thereto, of the retaining edge (s), which moves the retaining edge(s) out of engagement with the retaining projection on the insert part, in the locking position the locking element engages around the connecting element at least in a bend or pivot region in such a manner that a bending up of the connecting element in the region of the retaining edge(s) is prevented with certainty and the retaining edge(s) engage fixedly behind the retaining projection even under a heavy load. Even if pressure acts upon the locking element in a non-controlled manner in the radial direction, the locking element is able to lock the fixed connection, which is highly loadable in the axial direction, between the insert part and the receiving part. In a center or coupling position which is provided along the axial sliding path of the locking element between the locking position and the release position, the connecting element protrudes at least in regions in such a manner over the locking element that the retaining edge(s) is/are able to be bent up when the retaining projection which is provided on the insert part is pressed in and is/are able to engage behind the retaining projection on the insert part. In said center or coupling position, the plug connection according to the invention is already operationally reliable. As the plug connection according to the invention is formed of few components that can be produced at little expenditure, it is able to be produced in a comparatively cost-efficient manner.

A preferred further development according to the invention provides that the plug connection is developed as a detachable hose connection, that a connecting piece for pushing on a hose end of a flexible hose line is provided at least on the tubular insert part or at least on the sleeve-shaped receiving part and that the receiving part as well as the insert part can be connected together in a liquid-tight manner. In the case of said further-developing embodiment, the insert part or the receiving part can be held immovably on the inflow side or on the consumer side, whilst the respective other component is connected to a flexible hose line. A preferred embodiment, however, provides that both the receiving part and the insert part are connected to a hose portion of a flexible hose line and that, where required, said flexible hose line can be interrupted in the region of the plug connection.

In order to be able to seal in a liquid-tight manner an annular gap which possibly remains between the outside circumference of the insert part and the inside circumference of the receiving part, a preferred embodiment according to the invention provides that at least one annular groove, in which annular groove an annular seal is arranged, is provided at least on the outside circumference of the insert part or at least on the inside circumference of the receiving part.

So that the retaining edges are able to engage behind the retaining projection on the insert part in a secure and fixed manner, it is advantageous when the connecting element has at least one retaining strip which is oriented transversely with respect to the pressing-in direction and on which a retaining edge is provided.

The connection between the receiving part and the insert part can be locked in a particularly good manner and so as to be highly loadable when the connecting element has at least one pair of retaining strips which are provided on opposite sides of the receiving part.

In order to be able to bend up or pivot up the at least one retaining edge slightly both in the center position or the coupling position and in the release position, it is advantageous when the at least one retaining strip is held on at least one connecting arm of the connecting element, which connecting arm is developed so as to be bendable or pivotable up in a bend or pivot region.

The high level of functionality and the secure connection which can be achieved with the plug connection according to the invention is promoted when the at least one retaining strip is held on two connecting arms, which connecting arms cooperate with the strip end regions of the retaining strip with which they are associated.

It is possible for the receiving part and the insert part to be developed, for example, as a result of non-round cross sections in such a manner that the insert part is only able to be pressed into the receiving part in one relative position which is fixed in the circumferential direction. The handling of the plug connection according to the invention is made considerably easier, however, when the insert part which is located in the receiving part is freely rotatable, but is held securely and fixedly in the axial direction; in the case of the last-mentioned design, it is advantageous when a circumferential retaining projection which is developed preferably in the manner of an annular flange is provided on the outside circumference of the insert part.

When the insert part is pressed into the receiving part, the retaining strips can be surmounted particularly well by the retaining projection until the retaining projection is engaged behind by the retaining edges when a run-up inclination, which converts a pressing-in movement of the insert part into a bending up or pivoting up movement of the at least one connecting arm, is provided on each retaining strip.

It is advantageous when there is provided a sliding guide which converts an axial pushing movement of the locking element into a bending up or pivoting up movement, oriented transversely thereto, of the retaining edges, and when the sliding guide has at least one sliding projection which is provided on the inside circumference of the locking element and which interacts with at least one sliding path which is associated therewith on the connecting element. In this case, uniform bending up or pivoting up of the retaining strips and easy releasing of the retaining edges from the retaining projection on the insert part is promoted when a sliding path is provided in each case on the adjacent connecting arms of at least two retaining strips which are provided on opposite sides of the receiving part and when the sliding paths interact with a sliding projection which is associated therewith. In this case, a preferred embodiment according to the invention which is particularly simple to handle provides that a sliding projection is provided in each case on opposite sides of the inside circumference of the locking element and when said sliding projections interact in each case with a pair of sliding paths which are associated with one another.

In order to signal in particular the locking position clearly to the user, it is advantageous when the retaining strips have on the outside in each case an impression, into which impressions in each case at least one associated latching projection, which is provided on the inside circumference of the locking element, locks on the outside. So that the locking of the latching projection in the impression is particularly clearly detectable and so that, for this purpose, the impression is also able to be developed sufficiently deeply without weakening a larger amount of the material of the retaining strips, it is expedient when the retaining strips comprise on their outside surface, at least no more than in regions, a curvature which is oriented transversely with respect to the pressing-in direction, and when the impression of the retaining strip is preferably provided centrally in the region of the curvature(s).

In order to be able to fasten the connecting element on the receiving part in a particularly solid and loadable manner, a preferred embodiment according to the invention provides that the connecting arms are connected preferably in an integral manner at their arm ends remote from the retaining strips to a retaining ring, which retaining ring is held in an impression on the outside circumference of the receiving part so as to be immovable in particular in an axial direction.

The locking element can be guided displaceably particularly well on the receiving part as well as on the connecting element connected thereto when the locking element has a substantially rectangular cross section at least on the side of the inside circumference and when the connecting element defines a substantially rectangular envelope circle on the side of the outside circumference, the form of which envelope circle is adapted to the rectangular inside cross section of the locking element.

In order to be able to signal in an easily recognizable manner that the plug connection according to the invention is not yet situated in its locking position, it is advantageous when the connecting element in the intermediate or coupling position protrudes at least in regions visibly over the locking element, and when said protruding part region of the connecting element carries a marking, in particular is colored in a signaling color. If the user is able to recognize the signal color on the connecting element, he is also able to recognize that the plug connection is currently only in its intermediate or coupling position and, where required, still has to be moved into the locking position.

In this connection it can be advantageous when the connecting element, with the locking element in the locking position, is covered and engaged around at least extensively and preferably completely by the locking element. As soon as the locking element covers and engages around the connecting element at least almost completely, unintentional releasing of the locking element from said locking position is avoided. At the same time, the protruding part region of the connecting element, which carries a marking, is also covered in such a manner that no incorrect information concerning the current position of the locking element is given to the user.

As the locking element, which engages around the connecting element in the locking position, is able to protrude laterally slightly over the outside contour of the hose line, there is possibly the risk of the locking element unintentionally getting caught on an obstacle by way of its protruding end-face edge and being moved from its locking position into the coupling position or even into the release position. In order to counter said risk effectively and in order to prevent unintentional displacement of the locking element, which is situated in the locking position, into the coupling position or even into the release position, a particularly advantageous further development according to the invention provides that a locking cap is held on the insert part, that the locking cap protrudes at least in regions over the outside circumference of the locking element, and that the locking cap is arranged in the locking position adjacent to the locking element. As in the case of said further-developing embodiment the locking cap is held on the insert part, and as the locking cap protrudes at least in regions over the outside circumference of the adjacent locking element, the locking element is prevented effectively from getting caught and from being displaced unintentionally even into the release position.

In this case, a particularly simple embodiment according to the invention which is easy to produce provides that the locking cap is developed as a ring disk which protrudes over the outside circumference of the locking element at least in regions.

In order to prevent at all times unintentional release of the connection which is realized with the insert part according to the invention, it can be expedient when the locking cap has an outside contour which is adapted to the outside circumference of the locking element and protrudes on all sides over the outside circumference of the locking element.

In this case, a preferred embodiment according to the invention provides that, in the locking position, the locking cap engages over the adjacent end face edge region of the locking element by way of a circumferential edge which is angled in the direction of the locking element.

BRIEF DESCRIPTION OF THE DRAWINGS

Further developments according to the invention are produced from the drawing in conjunction with the claims and the description. The invention is described below by way of a preferred exemplary embodiment, in which, in more detail:

DETAILED DESCRIPTION OF THE PREFERRED EMBODIMENTS

Figure 4:
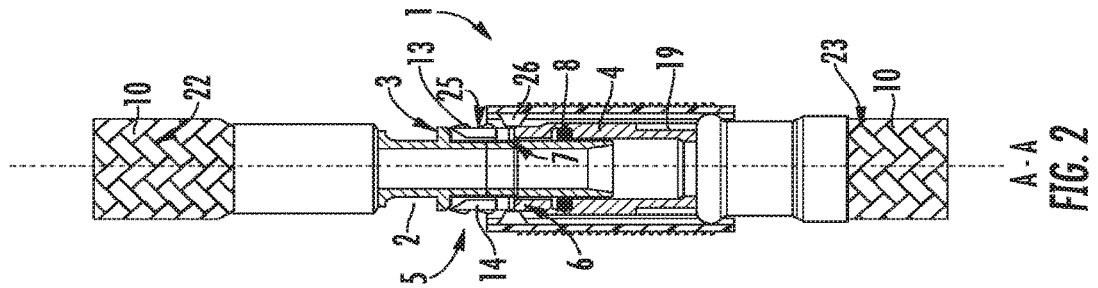
FIG. 4: shows a longitudinal section of the plug connection from FIGS. 1 to 3 in a locking position in which a sleeve-shaped locking element engages around the connecting element in such a manner that a bending up or pivoting out of the retaining edges provided on the connecting element is prevented.
Figure 5:
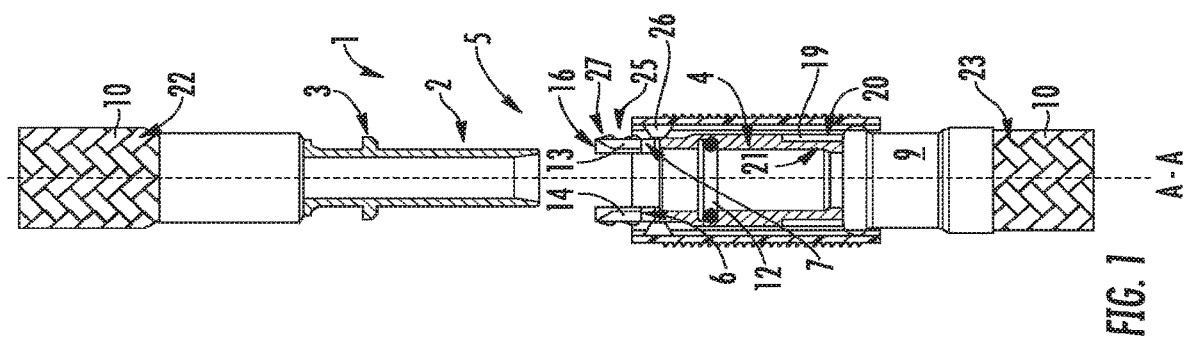
FIG. 5: shows the plug connection from FIGS. 1 to 4 in a release position, in which release position the axial pushing movement of the locking element can be converted into a bending up or pivoting up movement, oriented transversely thereto, of the retaining edges.
Figure 6:
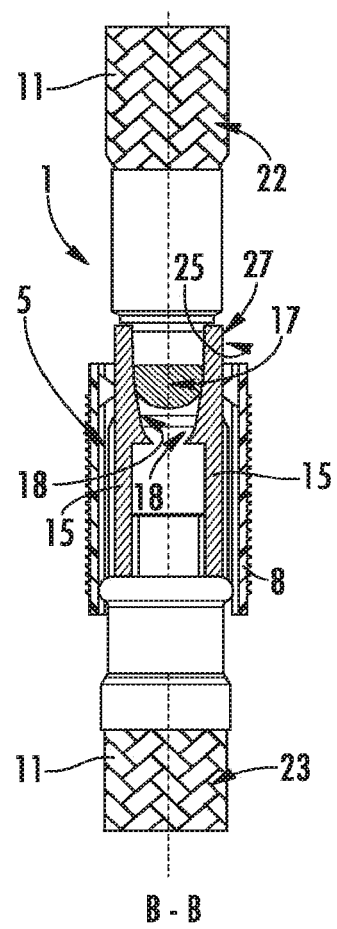
FIG. 6: shows a longitudinal section of the plug connection from FIGS. 1 to 5 in the center or coupling position with the insert part and the receiving part pressed into one another, directly before the locking element is displaced axially into the locking position.
Figure 7:
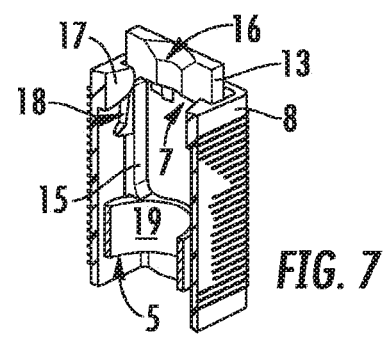
FIG. 7: shows a perspective longitudinal section of the connecting element and of the locking element, which is displaceably guided thereon, of the plug connection shown in FIGS. 1 to 6, FIG. 8: shows a perspective longitudinal section rotated by 90° in the circumferential direction of the component parts from FIG. 7, FIG. 9: shows a longitudinal section of the plug connection from FIGS. 1 to 8 with the locking element in the locking position.
Figure 8:
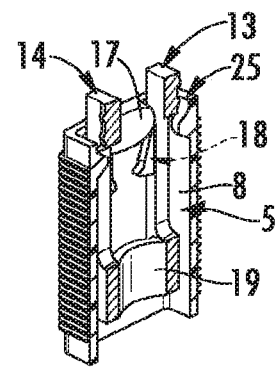
Figure 9:
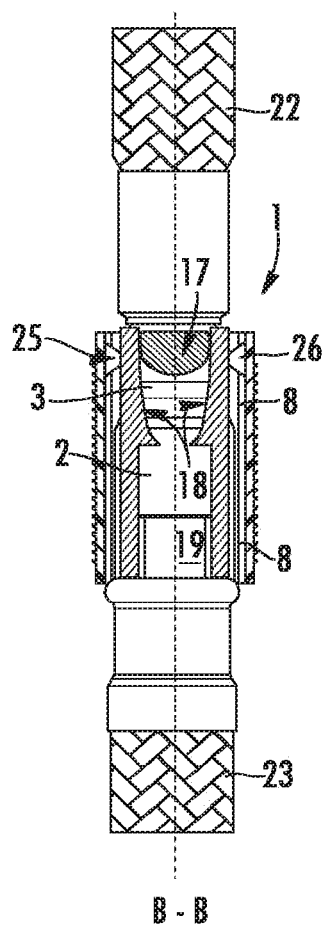
Figure 10:
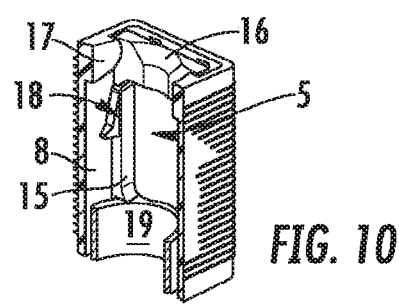
FIG. 10: shows a perspective longitudinal section of the connecting element and of the locking element of the plug connection shown in FIGS. 1 to 9, FIG. 11: shows a perspective longitudinal section rotated by 90° in the circumferential direction of the component parts from FIG. 10, FIG. 12: shows a longitudinal section of the plug connection from FIGS. 1 to 11 in the release position.
Figure 11:
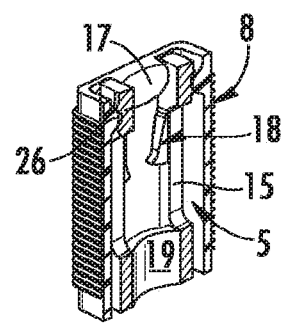

FIGS. 1 to 30 shows several exemplary embodiments of a detachable plug connection 1 and of the essential component parts thereof. Each of said plug connections 1 has a tubular insert part 2 which carries at least one retaining projection 3 on the outside circumference. The insert part 2 is insertable into the sleeve interior of a sleeve-shaped receiving part 4. The receiving part 4 is connected to a connecting element 5 which has to produce the detachable connection between the receiving part 4 and the insert part 2 once the insert part 2 has been pressed into the sleeve interior. After the insert part 2 has been pressed into the receiving part 4, the retaining projection 3 which is provided on the insert part 2 is engaged behind by inwardly directed retaining edges 6, 7 which are held on the connecting element 5 so as to be bendable up or pivotable up. The plug connection 1 comprises a sleeve-shaped locking element 8 which engages displaceably around the connecting element 5 in such a manner that the locking element 8 is displaceable between a release position which is shown in FIG. 5 and a locking position which is depicted in FIG. 4. Whereas in the release position the axial pushing movement of the locking element 8 can be converted into a bending up movement or a pivoting up movement, oriented transversely thereto, of the retaining edges 6, 7, which moves the retaining edges 6, 7 out of engagement with the retaining projection 3 on the insert part 2, in the locking position the locking element 8 engages around the connecting element 5 in a bend or pivot region in such a manner that a bending up of the connecting element 5 in the region of the retaining edges 6, 7 is prevented with certainty and the retaining edges 6, 7 engage fixedly behind the retaining projection 3 even under a high load. Even if the locking element 8 is acted upon with force in a non-controlled manner in the radial direction, the locking element is able to lock the fixed connection between the insert part 2 and the receiving part 4, which is highly loadable in the axial direction. In a center or coupling position shown in FIGS. 2 and 3, in which the connection is already operationally reliable and withstands operationally usual loads and which is provided along the axial pushing path of the locking element between the locking position and the release position, the connecting element 5 protrudes at least in regions in such a manner over the locking element 8 that the retaining edges 6, 7 are able to be bent up when the retaining projection 3 provided on the insert part 2 is pressed in and can engage behind the retaining projection 3 on the insert part 2. The part regions of the connecting element 5, which protrude over the locking element 8 and can be colored in a signal color, in this case signal that the plug connection 1 is not yet situated in its locking position. In this case, the surface center of gravity of the contact face of the retaining projection 3 on the one side and of the retaining edges 6, 7 on the other side are chosen such that no outwardly acting bending forces are generated in the connecting element 5 and in particular in its connecting arms 15. As the plug connection 1 according to the invention consists of few component parts which can be produced at little expenditure, it can be produced in a comparatively cost-efficient manner.

It is clear from FIGS. 1 to 6, 9 and 12 that the plug connection 1 is realized as a detachable hose connection and that, for this purpose, both the receiving part 4 and the insert part 2 are connected to a hose portion 22 or 23 of a flexible hose line 10. The hose portions 22 and 23 of the hose line are reinforced here by an external metal braid 11.

It can be seen in FIGS. 1 to 5 that an annular groove, in which is arranged an annular seal 12 which seals the annular gap between the receiving part 4 and the insert part 2 inserted therein in a liquid-tight manner, is provided on the inside circumference of the receiving part 4.

The connecting element 5 of the plug connection 1 is shown in more detail in FIGS. 20 to 24. The connecting element 5, which can also be produced, for example, from reinforced plastics material, where applicable, comprises a pair of retaining strips 13, 14 which are oriented transversely with respect to the pressing-in direction and on each of which a retaining edge 6, 7 is provided. The retaining strips 13, 14 are arranged on opposite sides of the receiving part 4 which can be seen in FIGS. 1 to 6, 9 and 12. The retaining strips 13, 14 are held in each case on two connecting arms 15 which cooperate with the strip end regions of the retaining strips 13, 14 associated therewith. On each retaining strip 13, 14 there is provided a run-up inclination 16 which converts a pressing-in movement of the insert part 2, once it has been inserted into the receiving part 4, into a bending up or pivoting up movement of the connecting arms 15. In order to support the resetting movement of the connecting arms 15, they are preferably developed so that they can be bent up or pivoted up in a spring elastic manner.

Figure 1:
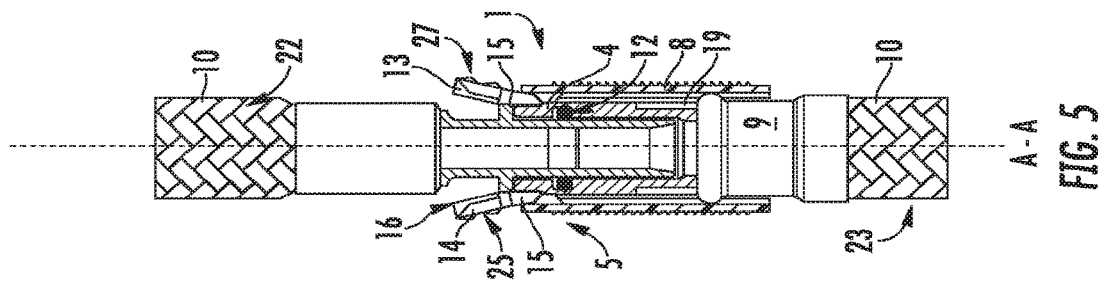
FIG. 1: shows an axial longitudinal section of a detachable plug connection which is developed as a hose connection, the one hose portion being held on an insert part, whilst the other hose portion being connected to a receiving part and said component parts of the plug connection being shown separately from one another in an exploded position.
Figure 2:
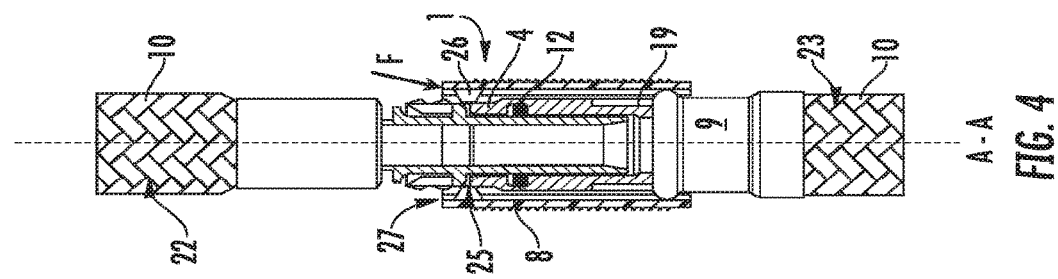
FIG. 2: shows the plug connection from FIG. 1 in a center or coupling position when the tubular insert part is being pressed into the sleeve interior of the sleeve-shaped receiving part.
Figure 3:
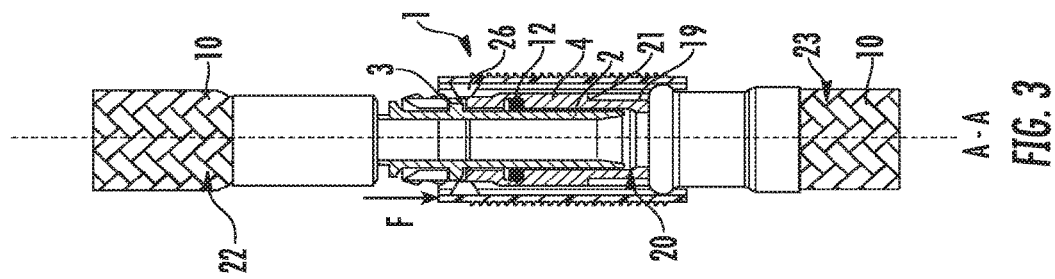
FIG. 3: shows the plug connection from FIGS. 1 and 2 in the center or coupling position after the insert part has been pressed in such a manner into the receiving part that a retaining projection which is provided on the insert part is engaged behind by the retaining edges of a connecting element which is connected to the receiving part.

It is clear from a comparison of FIGS. 2 and 3 that for the coupling of the insert part 2 and the receiving part 4 first of all the insert part 2 has to be inserted into the sleeve interior of the receiving part 4 until the retaining projection 3, which is provided on the insert part 2 and is realized here as a circumferential annular flange, abuts against the upper longitudinal edge of the retaining strips 13, 14 (cf. FIG. 2). As a result of pressing the insert part 2 further in, the retaining projection 3 runs onto the run-up inclinations 16—developed here as a longitudinally sectioned cone—in such a manner that the connecting arms 15 and the retaining edges 6, 7 which are connected to the connecting arms 15 by means of the retaining strips 13, 14 bend upward. As soon as the retaining edges 6, 7, which are formed by the bottom longitudinal side of the retaining strips 13, 14, engage behind the retaining projection 3, the connection between the insert part 2 and the receiving part 4 is held in the axial direction, operational reliability of the connection already being achieved here (cf. FIG. 3).

As a result of the displacement of the locking element 8, the plug connection can be moved into the locking position shown in FIG. 4 in which the locking element 8 also engages around the connecting element 5 in the bend or pivot region of its connecting arms 15 in such a manner that a bending up of the connecting element 5 in the region of the retaining edges 6, 7 is prevented. In this locking position, the connection produced between the insert part 2 and the receiving part 4 is locked against unintentional release even in the case of the locking element, 8, which, for example, is also produced, where applicable, from reinforced plastics material, being acted upon radially with a force.

A sliding guide, which converts an axial pushing movement of the locking element 8 into a bending up or pivoting up movement, oriented transversely thereto, of the retaining edges 6, 7 is provided in order to be able to re-release the connection between the insert and receiving parts 2, 4 which are preferably produced from metal and in particular from brass. Here said sliding guide comprises two sliding projections 17, which are provided on opposite sides on the inside circumference of the locking element 8 and interact on both sides in each case with a sliding path 18 which is formed by a wall portion which is integrally molded onto the connecting arms 15.

Figure 12:
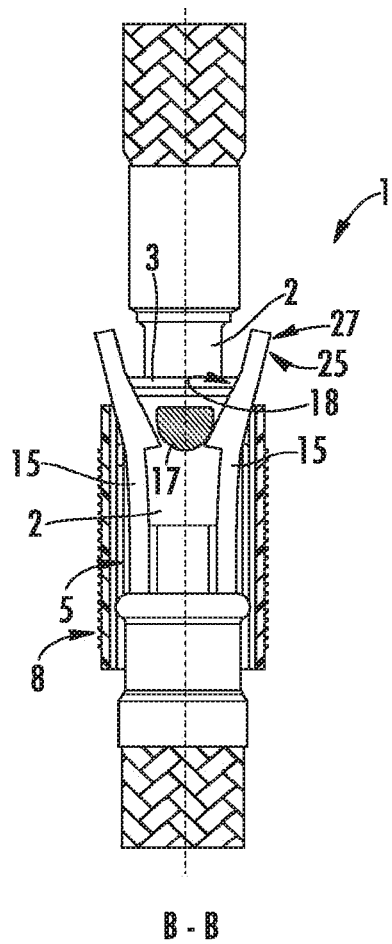
Figure 13:
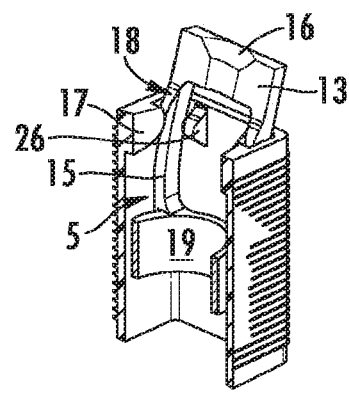
FIG. 13: shows a longitudinal section of the plug connection from FIGS. 1 to 12 in the release position shown in FIG. 12, FIG. 14: shows a perspective longitudinal section rotated by 90° in the circumferential direction of the component parts from FIG. 13, FIG. 15: shows a side view of the locking element of the plug connection shown in FIGS. 1 to 14, FIG. 16: shows a side view rotated by 90° in the circumferential direction of the locking element from FIG. 15, FIG. 17: shows a longitudinal section of the locking element from FIGS. 15 and 16 through the cutting plane C-C from FIG. 16, FIG. 18: shows a perspective top view of the locking element from FIGS. 15 to 17, FIG. 19: shows a top view of the locking element from FIGS. 15 to 18, FIG. 20: shows a side view of the connecting element of the plug connection shown in FIGS. 1 to 14 on its own.
Figure 14:
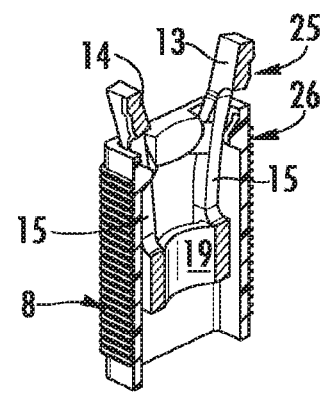
Figure 15:
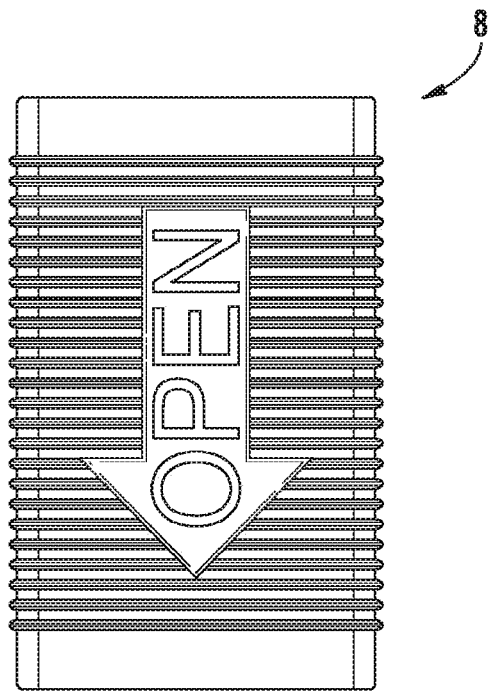
Figure 16:
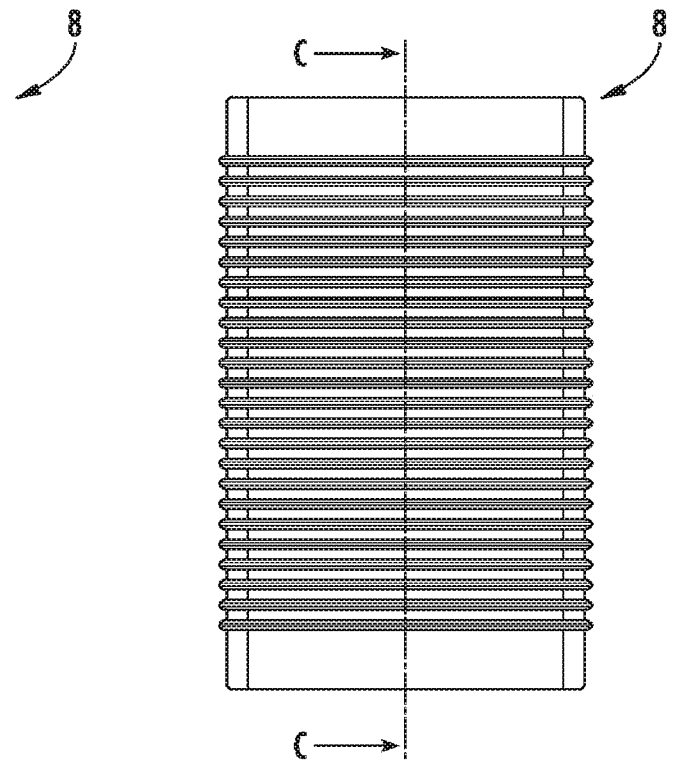
Figure 17:
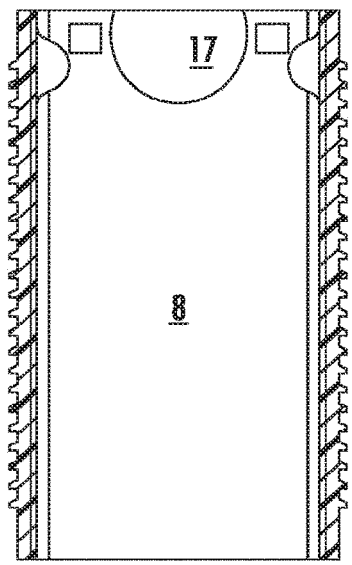
Figure 18:
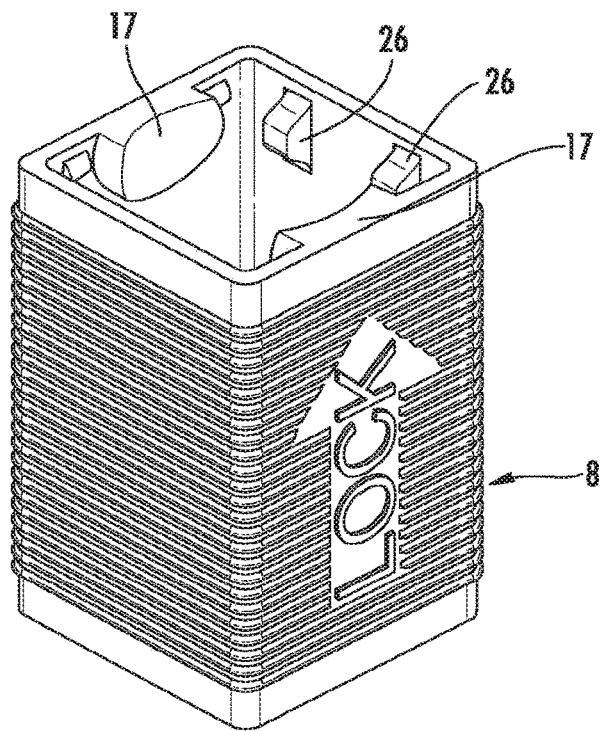
Figure 19:
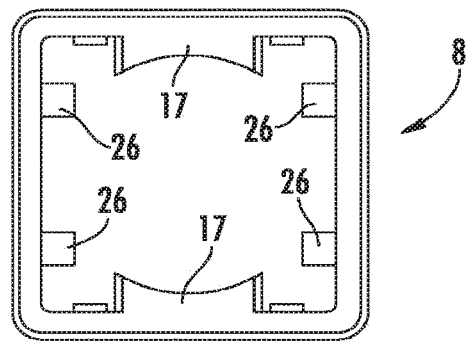
Figure 20:
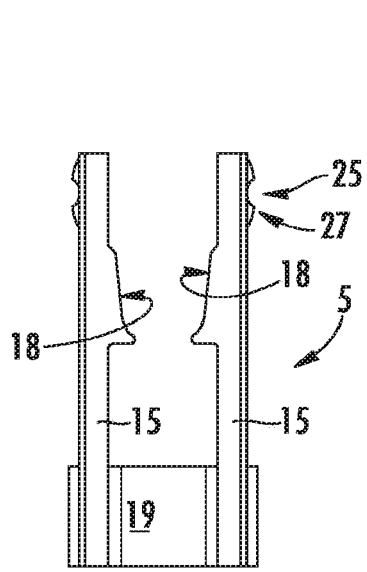
Figure 21:
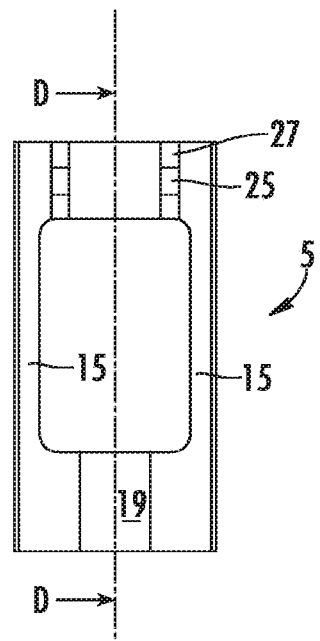
FIG. 21: shows a side view rotated by 90° in the circumferential direction of the connecting element from FIG. 20, FIG. 22: shows a longitudinal section of the connecting element from FIGS. 20 and 21 through the cutting plane D-D from FIG. 21, FIG. 23: a side perspective view of the connecting element from FIGS. 20 to 22, FIG. 24: a top view of the connecting element from FIGS. 20 to 23, FIG. 25: shows a top view of the plug connections from FIGS. 1 to 14, the cutting plane A-A of the longitudinal sections according to FIGS. 1 to 5 also being shown.

It is clear from a comparison between FIGS. 12 to 14, which show the plug connection 1 in the release position, that in the release position the locking element 8 is displaced back in such a manner that the sliding projections 17, which interact with the sliding paths 18, bend the connecting arms 15, which protrude in regions over the locking element 8, with the retaining strips 13, 14 integrally molded thereon, in such a manner up and outward that the retaining edges 6, 7 are disengaged from the retaining projection 3 and the plug connection 1 between the insert part 2 and the receiving part 4 is able to be released.

It can be seen in FIGS. 1 to 5 that the connecting arms 15 are integrally connected on their arm ends, which are remote from the retaining strips 13, 15 to a retaining ring 19, which retaining ring 19 is held in an impression 20, which is also realized, where applicable, as an annular groove, on the outside circumference of the receiving part 4. In this case, said retaining ring 19 is clamped between the annular shoulder 21 of the impression 20 which faces the retaining strips 13, 15 and a press sleeve 9, which press sleeve 9 holds the hose portion 23 on a portion of the receiving part 4 which is realized as a hose nipple. In this case, the receiving part 4 is pushed from the side of the connecting arms 15 through the retaining ring 19 until the retaining ring 19 strikes against the annular shoulder 21. It can be seen from FIGS. 15 to 19 that the locking element 8 has a substantially rectangular inside cross section at least on the side of the inside circumference. It can be seen from a comparison of FIGS. 15 to 19, on the one hand, and 20 to 24, on the other hand, and from the top views shown in FIGS. 25 and 26 that the connecting element 5 defines a substantially rectangular envelope circle on the outside circumference, the shape of which envelope circle is adapted to the rectangular inside cross section of the locking element 8. This complementarily non-round development of the locking element 8 and the connecting element 5 ensures that the locking element 8 is guided on the connecting element 5 so as to be non-rotatable, but displaceable in the axial direction.

Figure 22:
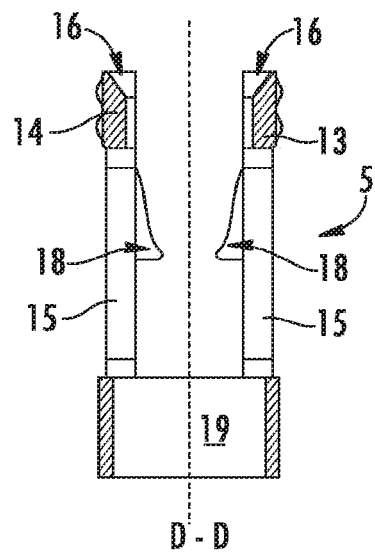
Figure 23:
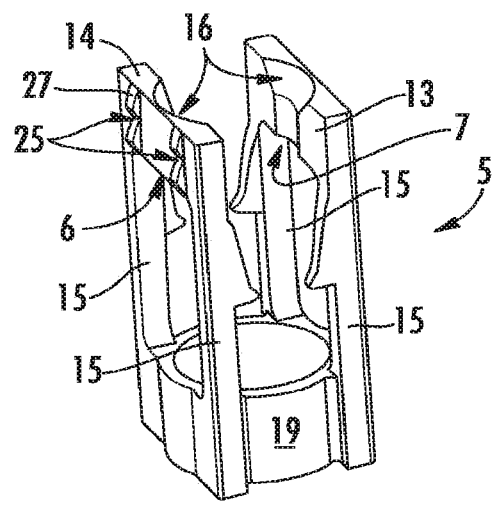
Figure 24:
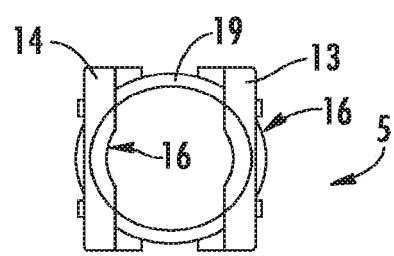
Figure 25:
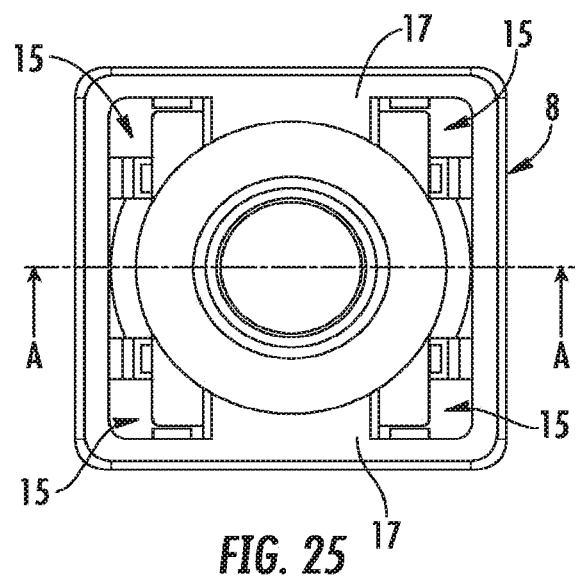
Figure 26:
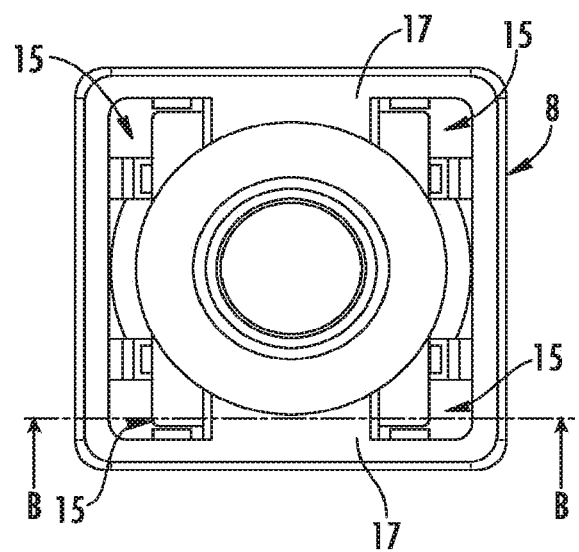
FIG. 26: shows a top view of the plug connections from FIGS. 1 to 14, the cutting plane B-B according to the longitudinal sections of FIGS. 6, 9 and 12 also being shown.

It is clear from FIGS. 20 to 24 and in particular from FIGS. 22 and 23 that the retaining strips 13, 14 have in each case on the outside an impression 25, into which impression 25 in each case at least one associated latching projection 26, which is provided on the inside circumference of the locking element, locks in the locking position (cf. FIG. 4). So that the user is able to recognize the locking of the plug connection into its locking position in a particularly good manner and so that the impression 25 can be developed in a particularly deep manner without weakening the retaining strips 13, 14, the retaining strips 13, 14 comprise on their outside surface at least in regions curvatures 27 which are oriented transversely with respect to the pressing-in direction. In this case, the impressions 25 of the retaining strips 13, 14 are provided approximately centrally in the region of the curvatures 27.

It can be seen in FIGS. 3 and 4 that the locking element 8, which engages around the connecting element 5 in the locking position, protrudes laterally slightly over the outside contour of the hose line 10. In this case, there is the risk of the locking element 8 getting caught unintentionally by on an obstacle way of its protruding end face edge and being moved from its locking position into the coupling position or even into the release position.

In order to counter this risk, the exemplary embodiments of the plug connection 1 shown in FIGS. 27 to 30 comprise a locking cap 24 which is held so as to be immovable on the insert part 2 in the longitudinal direction thereof. This locking cap 24 protrudes at least in regions in such a manner over the outside circumference of the locking element 8 that the locking element 8 getting unintentionally caught and displaced in an unwanted manner from the locking position into the coupling position or even into the release position is countered.

Figures 27, 28:
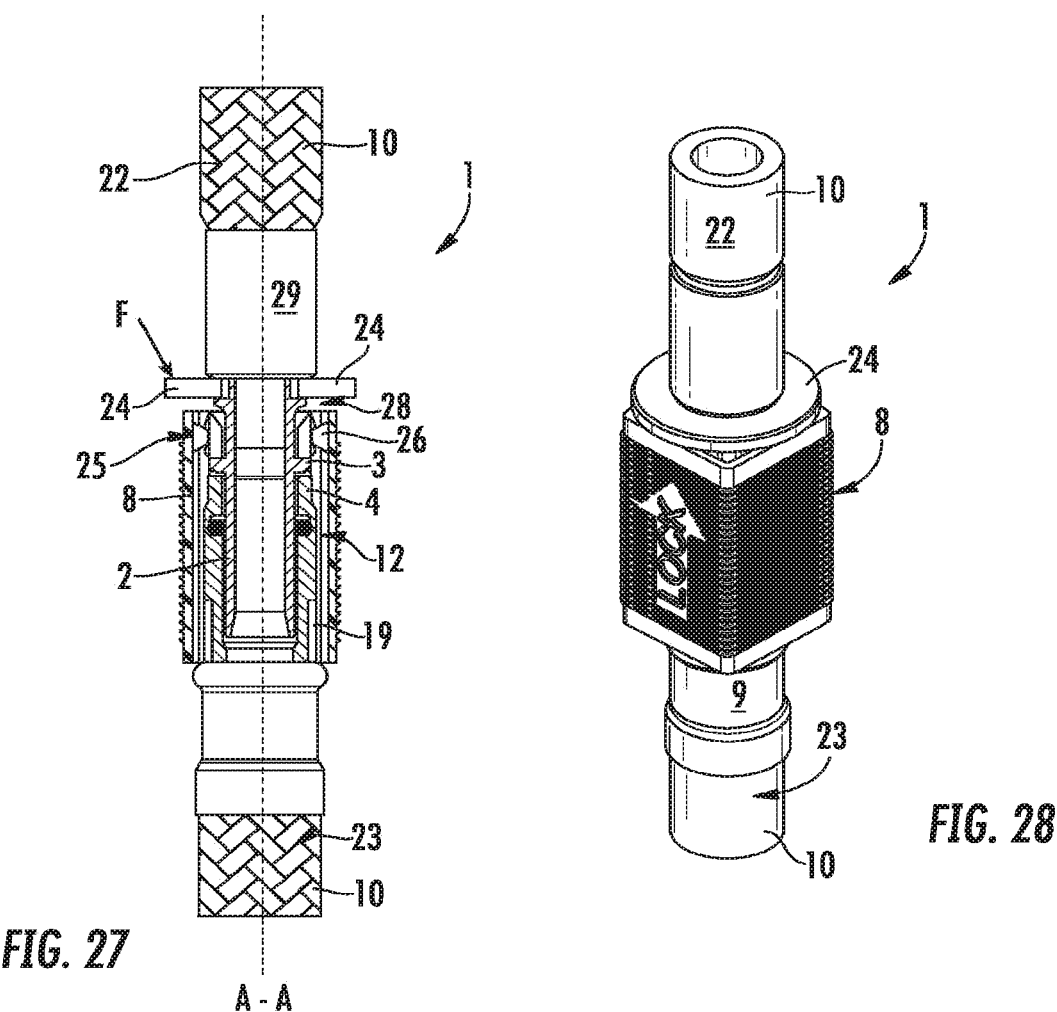
FIG. 27: shows a further exemplary embodiment of the plug connection shown in FIGS. 1 to 26, the exemplary embodiment shown here in a part longitudinal section in the locking position having a locking cap which is held on the insert part so as to be immovable in the longitudinal direction, is developed here as an annular disk and counters unintentional catching and displacing of the locking element from the locking position into the coupling or even into the release position.
FIG. 28: shows a perspective top view of the exemplary embodiment of the plug connection shown in FIG. 27, FIG. 29: also shows a part longitudinal section of a further exemplary embodiment of a plug connection which has a locking ring, the shape of which locking ring in this case, however, is adapted to the outside circumference of the locking element and protrudes laterally on all sides over the outside circumference of the locking element
Figures 29, 30:
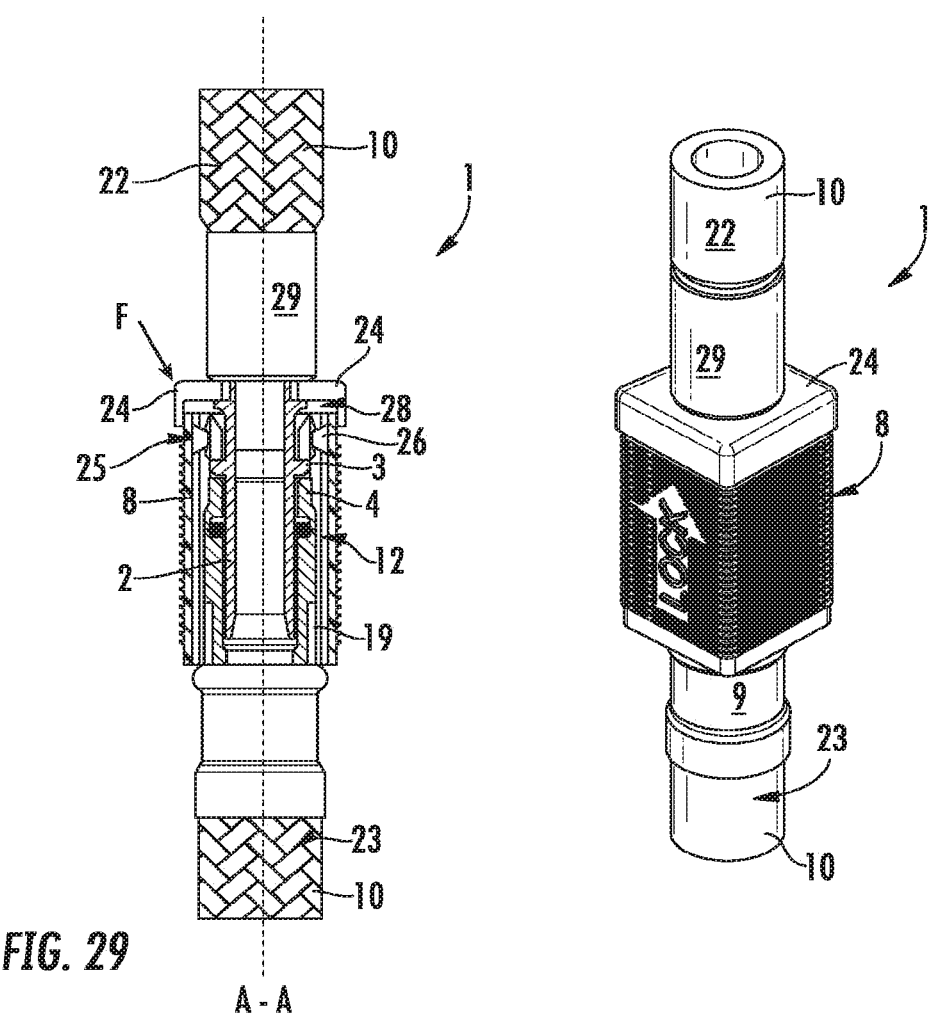
FIG. 30: shows a perspective top view of the exemplary embodiment of the plug connection shown in FIG. 29.

It can be seen in FIGS. 27 and 29 that a shoulder 28 is provided on the insert part 2 at a spacing from the retaining projection 3. Between the shoulder 28, which is preferably developed as a circumferential annular shoulder, and a crimping sleeve 29, which holds the hose end of the hose portion 22 on the insert part 2, the locking cap 24 is held so as to be immovable in the longitudinal direction of the insert part 2.

In the case of the exemplary embodiment shown in FIGS. 27 and 28, the locking cap 24 is developed as an annular disk which protrudes at least in regions over the outside circumference of the adjacent locking element 8 and, in this case, is developed so as to be circularly round on the outside circumference.

In contrast, the locking cap 24 of the exemplary embodiment shown in FIGS. 29 and 30 comprises an outside contour, the shape of which is adapted to the preferably rectangular and, in this case, square outside circumference of the locking element 8 and protrudes on all sides over the outside circumference of the locking element 8. In this case, the locking cap 24 of the exemplary embodiment shown in FIGS. 29 and 30 engages over the adjacent end face end region of the locking element 8 by way of a circumferential edge 30 which is angled in the direction of the locking element 8 in such a manner that the locking element 8 is not able to become caught unintentionally and consequently also not able to be released from the locking position.

For the rest, the exemplary embodiment of the plug connection 1 shown in FIGS. 28 to 30 corresponds to the design which has already been described in FIGS. 1 to 26.

LIST OF REFERENCES

1 Plug connection
2 Insert part
3 Retaining projection (on the insert part 2)
4 Receiving part
5 Connecting element
6 Retaining edge
7 Retaining edge
8 Locking element
9 Press sleeve
10 Hose line (with the hose portions 22 and 23)
11 Metal braid
12 Annular seal
13 Retaining strip
14 Retaining strip
15 Connecting arms
16 Run-up inclinations
17 Sliding projection (on the inside circumference of the locking element 8)
18 Sliding paths (on the connecting arms 15)
19 Retaining ring (of the connecting element 5)
20 Impression
21 Annular shoulder (of the impression 20)
22 Hose portion (on the insert part 2)
23 Hose portion (on the receiving part 4)
24 Locking cap (on the insert part 2)
25 Impression
26 Latching projection (on the circumferential side of the locking element 8)
27 Curvature
28 Shoulder (on the insert part 2)
29 Crimping sleeve (on the insert part 2)
30 Circumferential edge (on the locking cap 24 of the exemplary embodiment according to FIGS. 29 and 30)

What is claimed is:

1. A detachable plug connection comprising:
a tubular insert part which carries at least one retaining projection on an outermost circumference thereof,
a sleeve-shaped receiving part, an interior of which receives the tubular insert part;
a connecting element having a retaining ring, concentric with the receiving part, which attaches the connecting element to the receiving part, the receiving part comprising an annular seal; the connecting element comprising at least one inwardly directed, upwardly bendable or pivotable retaining edge, said at least one retaining edge engaging behind the at least one retaining projection upon pushing in of the insert part, and
a locking element that engages around the connecting element displaceably such that the locking element is displaceable between a release position and a locking position, in said locking position the locking element engages around the connecting element such that a bending or pivoting up of the connecting element in a region of the at least one retaining edge is prevented, the tubular insert part being dimensioned such that the tubular insert part engages the annular seal in a liquid-tight manner prior to displacement of the locking element into the locking position,
wherein the locking element is sleeve-shaped and engages around the connecting element and is axially displaceable, in the release position the axial pushing movement of the locking element is convertible into an opening movement, oriented transversely thereto, of the at least one retaining edge and the connecting element, with the locking element in an intermediate or coupling position, protrudes at least in regions over the locking element so that the at least one retaining edge is bent or pivoted up when the at least one retaining projection on the insert part is pressed in.

2. The plug connection as claimed in claim 1, wherein the plug connection is a detachable hose connection, a connecting piece for pushing on a hose end of a flexible hose line is provided at least on the tubular insert part or at least on the sleeve-shaped receiving part and the receiving part as well as the insert part are connectable together to be liquid-tight.

3. The plug connection as claimed in claim 1, wherein at least one annular groove, in which the annular seal is arranged, is provided on an inside circumference of the receiving part.

4. The plug connection as claimed in claim 1, wherein the connecting element has at least one retaining strip which is oriented transversely with respect to the pressing-in direction and on which the at least one retaining edge is provided.

5. The plug connection as claimed in claim 4, wherein the at least one retaining strip is held on at least one connecting arm of the connecting element, said at least one connecting arm is bendable or pivotable in a bend or pivot region.

6. The plug connection as claimed in claim 5, wherein a run-up inclination, that converts a pressing-in movement of the insert part into a bending up or pivoting up movement of the at least one connecting arm is provided on the at least one retaining strip.

7. The plug connection as claimed in claim 5, wherein a sliding path is provided on adjacent connecting arms of at least two of the retaining strips which are provided on opposite sides of the receiving part and the sliding paths interact with a sliding projection which is associated therewith.

8. The plug connection as claimed in claim 4, wherein the at least one retaining strip is held on two connecting arms, and said connecting arms cooperate with strip end regions of the at least one retaining strip with which the two connecting arms are associated.

9. The plug connection as claimed in claim 8, wherein the two connecting arms are connected integrally at arm ends thereof remote from the at least one retaining strip to the retaining ring, and said retaining ring is held in an impression on an outside circumference of the receiving part immovable in an axial direction.

10. The plug connection as claimed in claim 1, wherein the connecting element has at least one pair of retaining strips provided on opposite sides of the receiving part.

11. The plug connection as claimed in claim 10, wherein the at least one pair of retaining strips have on an outside portion thereof an impression, and at least one associated latching projection, which is provided on an inside circumference of the locking element, locks into said impressions in the locking position.

12. The plug connection as claimed in claim 11, wherein the at least one pair of retaining strips comprise on an outside surface thereof at least in regions at least one curvature which is oriented transversely with respect to the pressing-in direction, and the impressions of the at least one pair of retaining strips are provided centrally in a region of the at least one curvature.

13. The plug connection as claimed in claim 1, wherein the at least one circumferential retaining projection is in the form of an annular flange.

14. The plug connection as claimed in claim 1, further comprising a sliding guide which converts an axial pushing movement of the locking element into a bending up or pivoting up movement, oriented transversely thereto, of the at least one retaining edge, and the sliding guide has at least one sliding projection which is provided on an inside circumference of the locking element and which interacts with at least one sliding path which is associated therewith on the connecting element.

15. The plug connection as claimed in claim 1, wherein a sliding projection is provided in each case on opposite sides of an inside circumference of the locking element and said sliding projections interact in each case with a pair of sliding paths which are associated with one another.

16. The plug connection as claimed in claim 1, wherein the locking element has a substantially rectangular cross section at least on a side of an inside circumference and the connecting element defines a substantially rectangular envelope on a side of an outside circumference, a form of said envelope is adapted to the rectangular inside cross section of the locking element.

17. The plug connection as claimed in claim 1, wherein the connecting element in the intermediate or coupling position protrudes at least in regions visibly over the locking element, and said protruding part region of the connecting element is colored to signal that the plug connection is not yet situated in its locking position.

18. The plug connection as claimed in claim 1, wherein the connecting element, with the locking element in the locking position, is covered and engaged around at least extensively by the locking element.

19. The plug connection as claimed in claim 1, wherein a locking cap is held on the insert part, the locking cap protrudes at least in regions over an outside circumference of the locking element and the locking cap is arranged in the locking position adjacent to the locking element.

20. The plug connection as claimed in claim 19, wherein the locking cap is a ring disk which protrudes over the outside circumference of the locking element at least in regions.

21. The plug connection as claimed in claim 19, wherein the locking cap has an outside contour which is adapted to an outside circumference of the locking element and protrudes on all sides over the outside circumference of the locking element.

22. The plug connection as claimed in claim 19, wherein the locking cap engages over an adjacent end face edge region of the locking element by way of a circumferential edge which is angled in a direction of the locking element.

23. A detachable plug connection comprising:
a tubular insert part which carries at least one retaining projection on an outside circumference thereof,
a sleeve-shaped receiving part, an interior of which receives the tubular insert part;
a connecting element having a retaining ring, concentric with the receiving part, which attaches the connecting element to the receiving part; the connecting element comprising at least one inwardly directed, upwardly bendable or pivotable retaining edge, said at least one retaining edge engaging behind the at least one retaining projection upon pushing in of the insert part, and
a locking element, comprising a sliding projection, the locking element engages around the connecting element displaceably such that the locking element is displaceable between a release position and a locking position, in said release position, the sliding projection of the locking element is displaced in such a manner that the sliding projection bends the connecting element, which protrudes axially beyond the locking element upwardly and outwardly such that the at least one retaining edge is disengaged from the at least one retaining projection and the plug connection between the insert part and the receiving part is able to be released and in said locking position the locking element engages around the connecting element such that a bending or pivoting up of the connecting element in a region of the at least one retaining edge is prevented,
wherein the locking element is sleeve-shaped and engages around the connecting element and is axially displaceable, in the release position the axial movement of the locking element is convertible into an opening movement, oriented transversely thereto, of the at least one retaining edge and the connecting element, with the locking element in an intermediate or coupling position, protrudes axially beyond the locking element so that the at least one retaining edge is bent or pivoted up when the at least one retaining projection on the insert part is pressed into the receiving part.

24. A detachable plug connection comprising:
a tubular insert part which carries at least one retaining projection on an outside circumference thereof,
a sleeve-shaped receiving part, an interior of which receives the tubular insert part;
a connecting element having a retaining ring, concentric with the receiving part, which attaches the connecting element to the receiving part; the connecting element comprising at least one inwardly directed, upwardly bendable or pivotable retaining edge, said at least one retaining edge engaging behind the at least one retaining projection upon pushing in of the insert part, and
a locking element that engages around the connecting element displaceably such that the locking element is displaceable between a release position and a locking position, in said locking position the locking element engages around the connecting element such that a bending or pivoting up of the connecting element in a region of the at least one retaining edge is prevented,
wherein the locking element is sleeve-shaped and engages around the connecting element and is axially displaceable, in the release position the axial movement of the locking element is convertible into an opening movement, oriented transversely thereto, of the at least one retaining edge and the connecting element, with the locking element in an intermediate or coupling position, extends axially beyond the locking element so that the at least one retaining edge is bent or pivoted up when the at least one retaining projection on the insert part is pressed into the receiving part.

\* \* \* \* \*